(12) United States Patent
Han (10) Patent No.: US 6,501,509 B1
(45) Date of Patent: Dec. 31, 2002

(54) VIDEO FORMAT CONVERTER (75) Inventor: Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/487,542

(22) Filed: Jan. 19, 2000

(30) Foreign Application Priority Data

Jan. 19, 1999 (KR) .............................................. 99/1495

(51) Int. Cl.$^7$ .............................................. H04N 11/20
(52) U.S. Cl. ...................................... 348/441; 348/581
(58) Field of Search ................................ 348/441–459, 348/581; 382/298–300

(56) References Cited

U.S. PATENT DOCUMENTS

| | | | | |
|---|---|---|---|---|
| 5,784,114 A | * | 7/1998 | Borer et al. ................. | 348/452 |
| 5,838,385 A | * | 11/1998 | Reder et al. ................. | 348/565 |
| 6,069,670 A | * | 5/2000 | Borer ......................... | 348/620 |

* cited by examiner

*Primary Examiner*—Victor R. Kostak
(74) *Attorney, Agent, or Firm*—Birch, Stewart, Kolasch & Birch, LLP (57) ABSTRACT

A video format converter for converting resolution of an input digital image to a different resolution includes an adder for adding the number of input pixels L to a feedback value, a modulo operation unit for allowing an output value of the adder as a numerator value to be feedback to the adder if the output value of the adder is smaller than the number of output pixels, but outputting a load signal so that a new data is loaded into them if the output value of the adder is greater than the number of output pixels M, and at the same time for outputting the remainder divided the output value of the adder by the number of output pixels to the adder, and a divider for performing division using the output value of the modulo operation unit as a numerator value and the number of output pixels as a denominator value and for outputting the resultant value as a weighted value α. Since the video format converter has a simple structure, a small amount of hardware can be realized. Also, since there are provided various input/output formats, it is not necessary to correct hardware due to a newly added format. Since differences in color coordinate sampling and scanning types as well as format size are considered, all kinds of format conversion can be realized without addition of a separate hardware.

17 Claims, 6 Drawing Sheets

VIDEO FORMAT CONVERTER

BACKGROUND OF THE INVENTION

1. Field of the Invention

The present invention relates to a digital video processor and more particularly to an apparatus for converting resolution of an input digital image to a different resolution.

2. Discussion of Related Art

A digital TV receives images of various types and resolution (or picture quality) such as a high definition grade and a standard definition grade. Also, it is expected that there are provided various types of display devices in a digital TV, such as an existing cathode ray tube (CRT) TV or projection TV adapted to an interlaced scanning type, and a liquid crystal display (LCD) and plasma display panel (PDP) adapted to a sequential scanning type. Thus, a digital TV requires a format converter which converts the type and size of images in compliance with the format of the display device.

Figure 1:
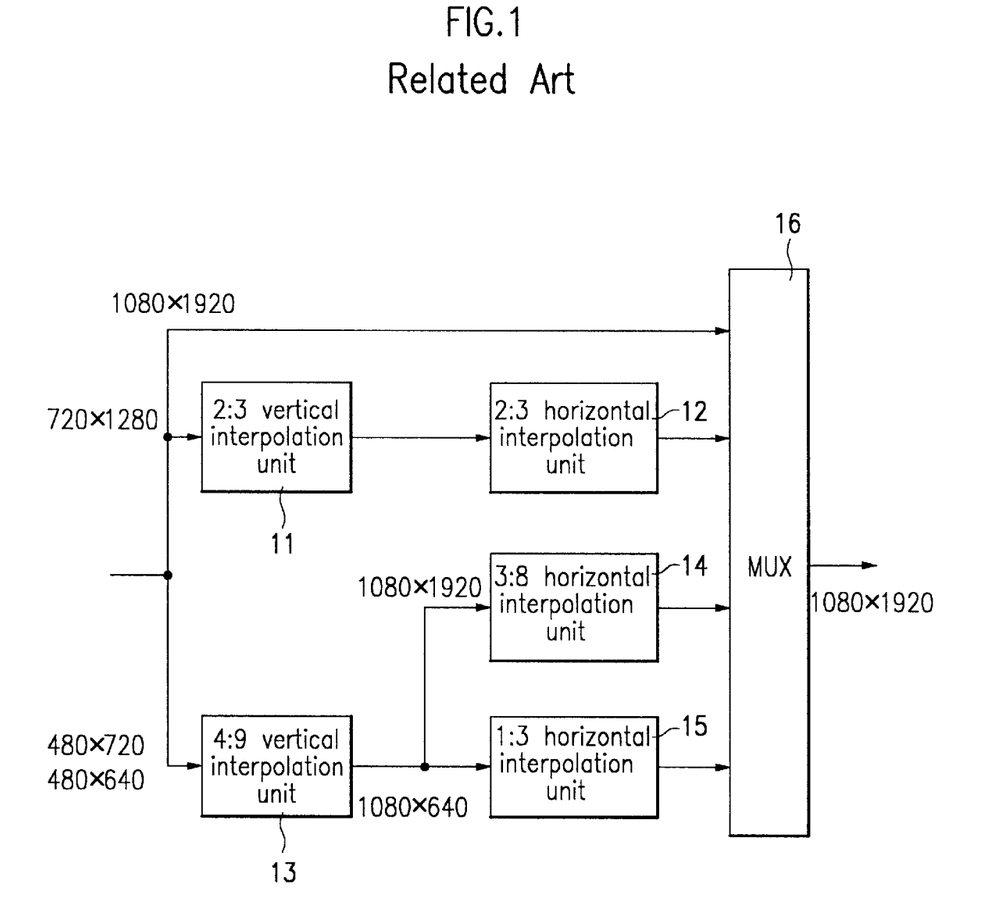
FIG. 1 is a block diagram of a video format converter in the related art.

FIG. 1 is a block diagram of a general format converter, in which a plurality of format converters are used in parallel to convert various input formats to a desired output format.

In other words, if a format of an input image is 1080×1920 and a format of an output is also 1080×1920, the input image is output through a multiplexer 16 as it is. By contrast, if a format of an input image 720×1280, the input image is interpolated into 1080×1920 by a vertical 2:3 interpolation unit 11 and a horizontal interpolation unit 12 among a plurality of format converters in parallel connected with one another and then is output through the multiplexer 16.

Also, if a format of an input image is 480×640 and a format of an output image is 1080×1920, the input image is interpolated into 1080×1920 by a vertical 4:9 interpolation unit 13 and a horizontal 3:8 interpolation unit 14 among a plurality of format converters in parallel connected with one another and then is output through the multiplexer 16.

Likewise, if a format of an input image is 480×640 and a format of an output image is 1080×1920, the input image is interpolated into 1080×1920 by the vertical 4:9 interpolation unit 13 and a horizontal 1:3 interpolation unit 15 among a plurality of format converters in parallel connected with one another and then is output through the multiplexer 16.

However, since a new format converter is required whenever a new input format is added, the size of hardware increases and correction of a circuit for a new input format or output format is not easy.

SUMMARY OF THE INVENTION

Accordingly, an object of the present invention is to solve at least the problems and disadvantages of the related art.

An object of the present invention is to provide a format converter for facilitating conversion of input/output formats by hardware.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a format converter includes a memory unit for temporarily storing an input image, a delay unit for delaying data output from the memory unit for the unit of line or pixel, and an operation unit for calculating a weighted value a per clock and applying the weighted value α to an output value of the memory unit and a delay value of the delay unit to obtain a new pixel value.

In a preferred embodiment of the present invention, the operation unit includes a calculating unit for calculating the weighted value α, a multiplier for multiplying a difference value between a pixel value delayed by the delay unit and a pixel value input through the memory unit by the weighted value α, and an adder for adding a pixel value from the delay unit to an output value of the multiplier. The calculating unit includes an adder for adding the number of input pixels to a feedback value, a modulo operation unit for allowing an output value of the adder to be feedback to the adder and also outputting a load signal to the memory unit and the delay unit so that a new data is loaded into them if the output value of the adder is greater than the number of output pixels, and at the same time for outputting the remainder divided the output value of the adder by the number of output pixels to the adder, and a divider for performing division using the output value of the modulo operation unit as a numerator value and the number of output pixels as a denominator value and for outputting the resultant value as a weighted value α.

Furthermore, the calculating unit includes an initial value generator for generating an initial value required for format conversion using information on scanning types, information on color coordinate sampling, and information on the number of input pixels and the number of output pixels, an addend generator for generating addend using information on scanning types, information on color coordinate sampling, and information on the number of input pixels, an adder for initially outputting a value generated by the initial value generator and then adding addend generated by the addend generator to a feedback value, a modulo operation unit for outputting an output value to the adder and also outputting a load signal to the memory unit and the delay unit so that a new data is loaded into them if the output value of the adder is greater than the number of output pixels, and at the same time for outputting the remainder divided the output value of the adder by the number of output pixels to the adder, and a divisor calculator for calculating a denominator value required for division using information scanning types, information on color coordinate sampling, and information on the number of output pixels, and a divider for performing division using the output value of the modulo operation unit as a numerator value and the output value of the divisor calculator as a denominator value and for outputting the resultant value as a weighted value α.

It is to be understood that both the foregoing general description and the following detailed description are exemplary and explanatory and are intended to provide further explanation of the invention as claimed.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Generally, a pixel value calculated per format conversion output is obtained by linear interpolation of two input pixels. At this time, linear interpolation ratio depends on positions of linear interpolation. Also, linear interpolation ratio depends on format conversion ratio between the number of input pixels and the number of output pixels.

In the present invention, it is intended that rules to automatically calculate linear interpolation ratio between the two pixels and conversion time of input pixels apply to hardware.

Figure 2:
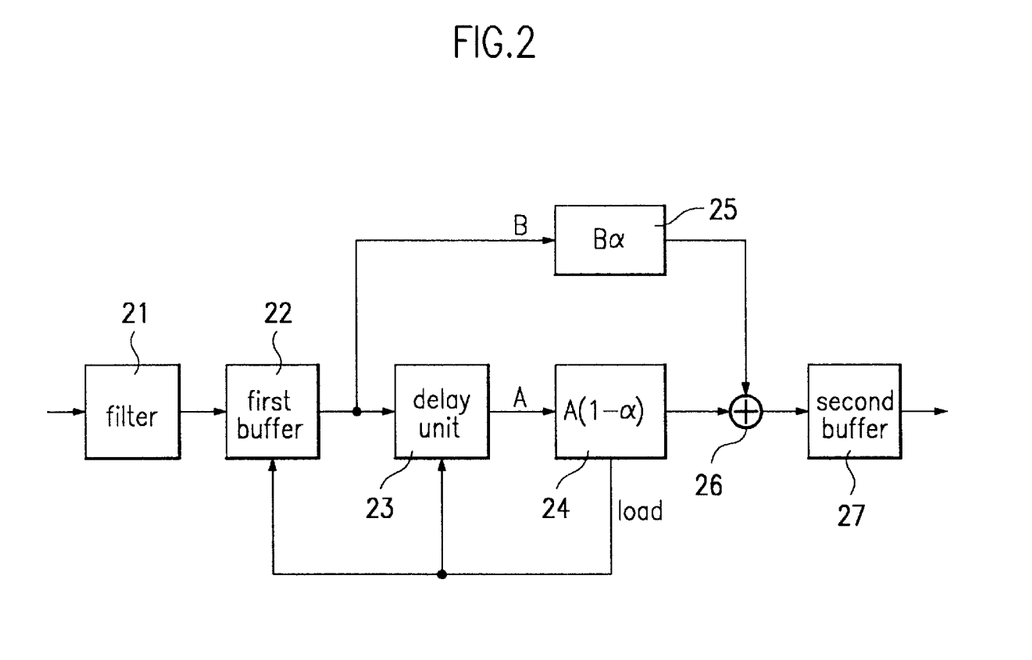
FIG. 2 is a block diagram of a video format converter according to one embodiment of the present invention.

FIG. 2 is a block diagram of a video format converter according to one embodiment of the present invention.

Referring to FIG. 2, the video format converter includes a filter 21, a first buffer 22, a delay unit 23, a first operation unit 24, a second operation unit 25, an adder 26, and a second buffer 27. The filter 21 eliminates aliasing when the size of an input image is reduced. The first buffer 22 temporarily stores the input image through the filter 21. The delay unit 23 delays line data or pixel data depending on purpose of use. The first operation unit 24 calculates a weighted value α and then multiplies a pixel value A delayed by the delay unit 23 by 1−α. The second operation unit 25 calculates a weighted value α and then multiplies a currently input pixel value B by α. The adder 26 adds an output value of the first operation unit 24 to an output value of the second operation unit 25. The second buffer 27 temporarily stores an output value of the adder.

The first operation unit 24 calculates input time of a new pixel and adds a data load signal to the buffer 22 and the delay unit 23 so that a pixel value for format conversion is updated.

α is a weighted value applicable to all of input/output formats to realize a format converter. The main feature of the present invention is to calculate α.

Figure 3:
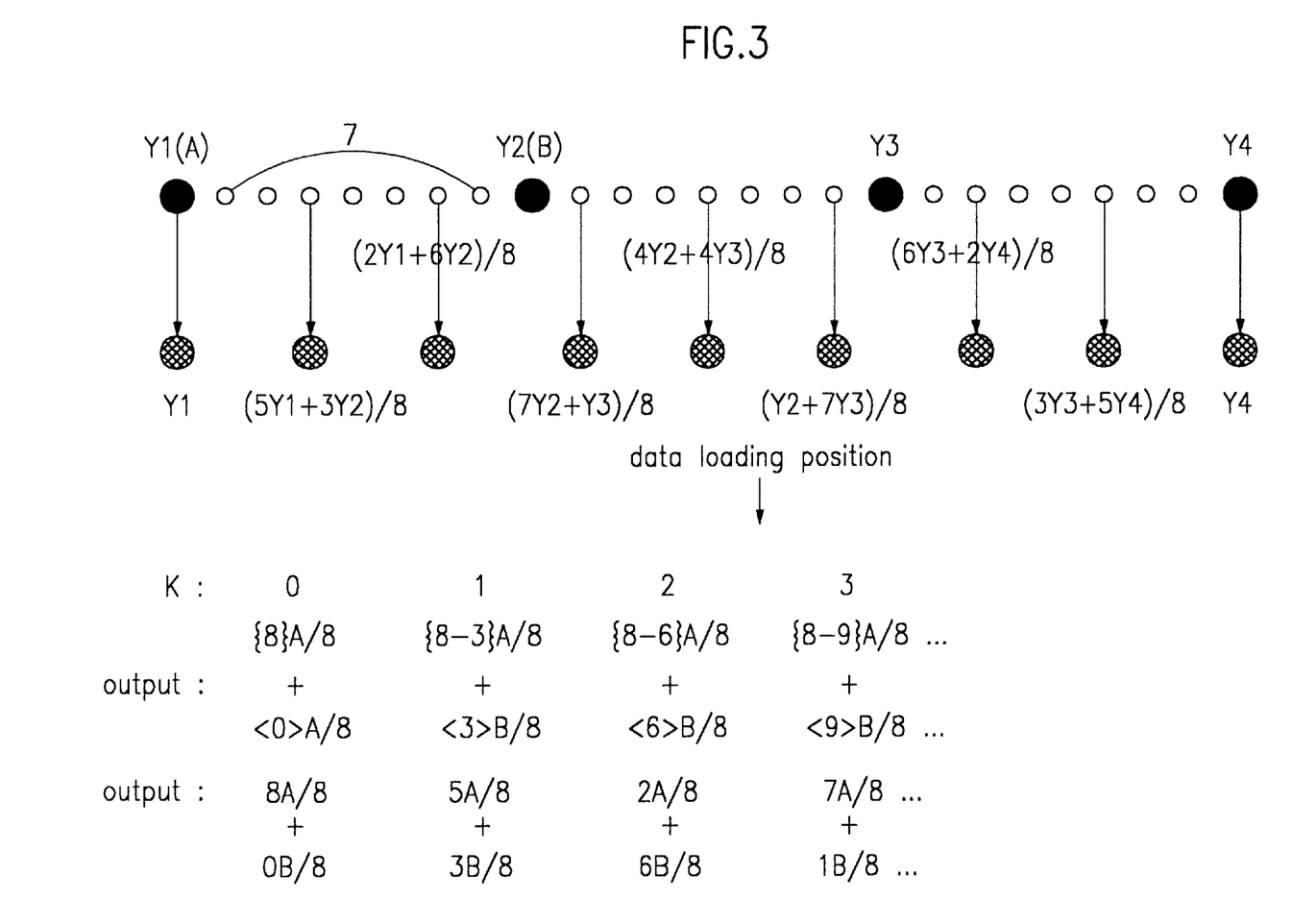
FIG. 3 show an example of 3:8 up-conversion adapted to the present invention.

FIG. 3 show an example of ratio of 3:8 between the number of input pixels and the number of output pixels. A pixel value calculated per format conversion output is obtained by linear interpolation of two input pixels. At this time, it is noted that linear interpolation ratio is varied depending on positions. That is to say, linear interpolation ratio is varied in the order of $$\frac{5Y1+3Y2}{8}, \frac{2Y1+6Y2}{8}, \frac{7Y2+Y3}{8}, \cdots.$$

Also, as a format conversion ratio between the number of input pixels and the number of output pixels is varied, a linear interpolation ratio is varied.

At this time, there is a rule α for automatically calculating linear interpolation ratio between two pixels and conversion time of input pixels A and B. The linear interpolation ratio and conversion time of input pixels A and B can easily be controlled by the rule α.

Meanwhile, the output results of the first and second operation units 24 and 25 in FIG. 2 added to the adder 26 are as follows:

$$\text{The results of the adder } 26 = B\alpha + A(1-\alpha) \quad \text{[Equation 1]}$$
$$= B\alpha + A - A\alpha$$
$$= A + \alpha(B-A)$$

In the present invention, the most hardware is required to calculate α. Thus, the first and second operation units 24 and 25 of FIG. 1 are optimized to reduce the number of times for calculating α, so that a video format converter can be obtained as shown in FIG. 4.

Figure 4:
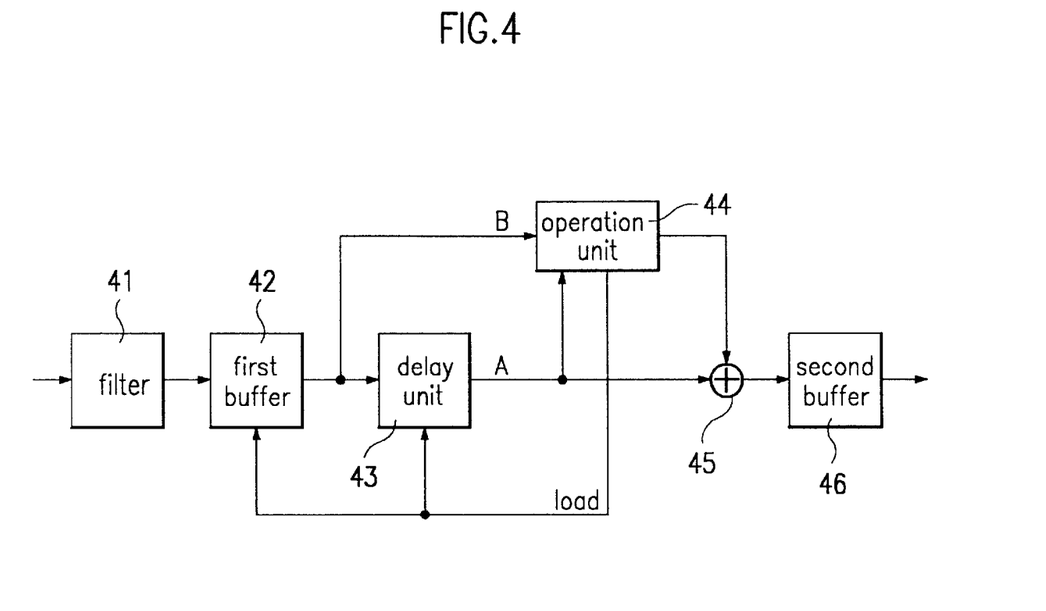
FIG. 4 is a block diagram of a video format converter according to another embodiment of the present invention.

In other words, the video format converter of FIG. 4 includes a filter 41, a first buffer 42, a delay unit 43, an operation unit 44, an adder 45, and a second buffer 46. The filter 41 eliminates aliasing when the size of an input image is reduced. The buffer 42 temporarily stores the input image through the filter 41. The delay unit 43 delays line data or pixel data depending on purpose of use. The operation unit 44 calculates a weighted value α and then multiplies a difference value between a pixel value A delayed by the delay unit 43 and a pixel value B input through the first buffer 42 by α. The adder 45 adds an output value of the operation unit 44 to the pixel value A of the delay unit 43. The second buffer 46 temporarily stores an output value of the adder 45 as occasion demands. The operation unit 44 calculates input time of a new pixel and adds a data load signal to the first buffer 42 and the delay unit 43 so that a pixel value for format conversion is updated.

Figure 5:
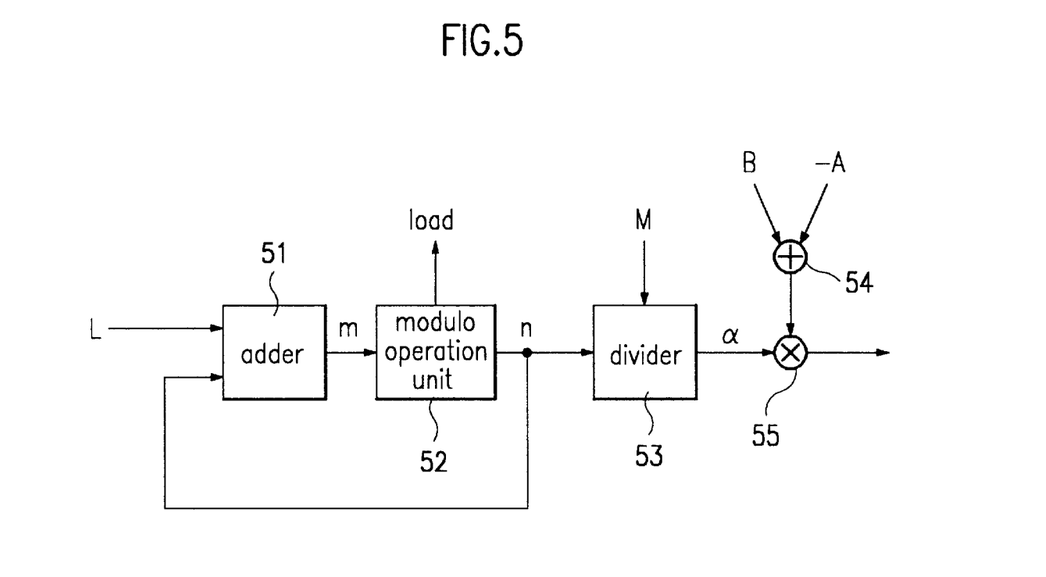
FIG. 5 is a detailed block diagram of an operation unit of FIG. 4.

FIG. 5 is a detailed block diagram of the operation unit 44 which calculates the weighted value α.

The operation unit 44 includes an adder 51, a modulo operation unit 52, a divider 53, a subtracter 54, and a multiplier 55. The adder 51 adds the number of input pixels L to a feedback value n. The modulo operation unit 52 outputs the remainder divided the output value m of the adder 51 by the number of output pixels M as a numerator value. At the same time the modulo operation unit 52 outputs a load signal if the output value m of the adder 51 is greater than the number of output pixels M so that an input pixel is updated. The divider 53 performs division using the output value of the modulo operation unit 52 as a numerator value and the number of output pixels M as a denominator value and outputs the resultant value as a weighted value α. The subtracter 54 subtracts the delayed pixel value A from the input pixel B and obtains a difference value (B−A) thereof. The multiplier 55 multiplies an output value of the divider 53 by an output value of the subtracter 54.

Figure 6:
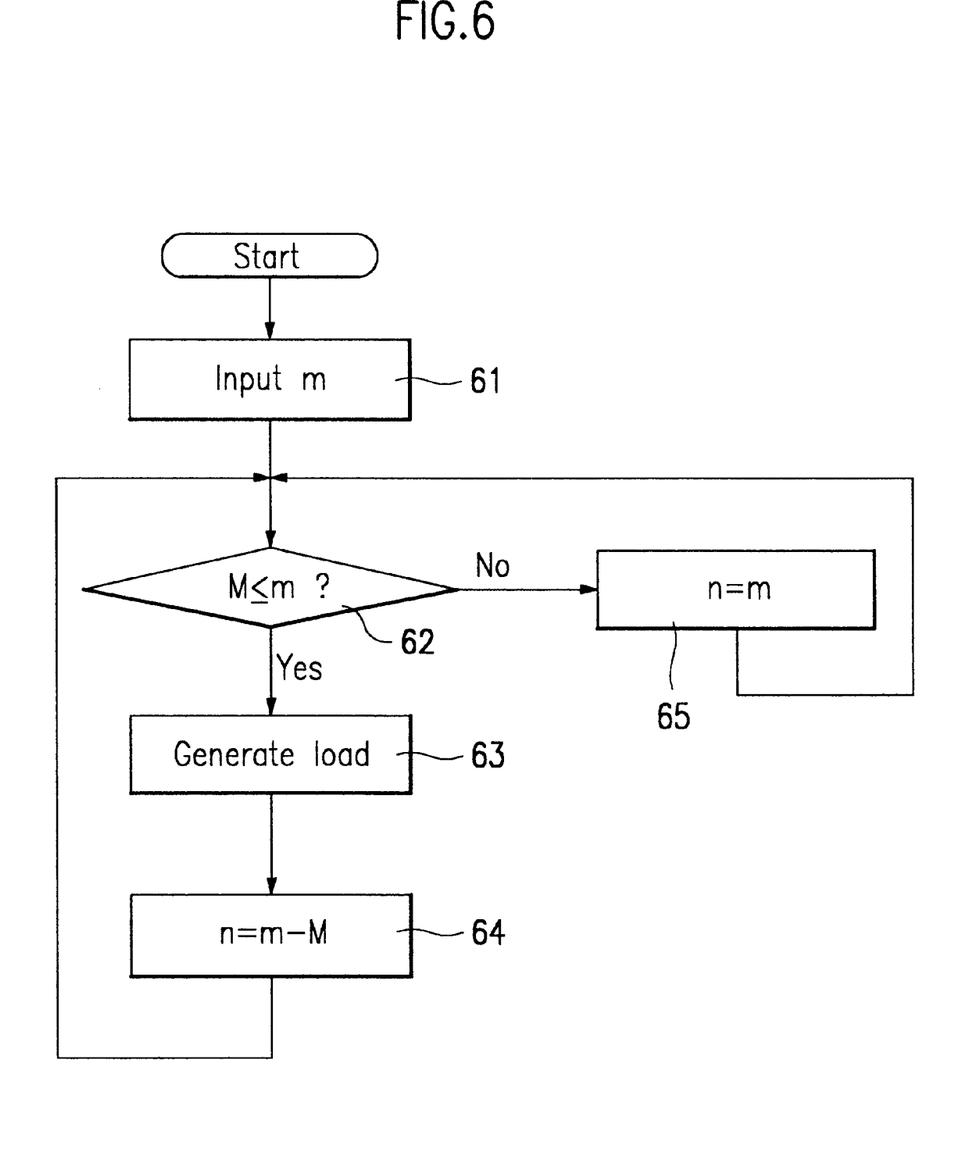
FIG. 6 is a flow chart of the operation of a modulo operation unit of FIG. 5.

FIG. 6 is a flow chart showing the operation of the modulo operation unit 52.

In the aforementioned present invention, respective blocks in FIG. 2 have the same configuration and operation as those of FIG. 4 except that there are two operation units in the video format converter of FIG. 2. In this respect, the operation of the respective blocks of the video format converter according to the present invention will be described with reference to FIG. 4.

In other words, the filter 41 eliminates aliasing when the size of an input image is reduced. The buffer 42 acts to store the image data, that is, pixels input through the filter 41 so as to continue to output the image data to the next block as occasion demands. The delay unit 43 includes a line memory or flip flop(F/F) for storing the image data output through the buffer 42 for the unit of line or pixel as occasion demands, and provides a pixel value required for α operation. At this time, the first buffer 42 and the delay unit 43 update an output pixel value to the next pixel value in accordance with a load signal from the operation unit 44.

Meanwhile, the operation unit 44 acts to calculate a new pixel value per clock, and the new pixel value is added to the output value of the delay unit 43 by the adder 45 to obtain a final resultant value. At this time, the second buffer 46 at an output terminal of the adder 51 be required to store the final resultant value temporarily when the size of input image is reduced.

The operation unit 44 will be described in detail with reference to FIG. 5. In FIG. 5, it is assumed that the number of input pixels is L and the number of output pixels is M. In this case, there is automatically provided a new weighted value depending on the number of input/output pixels. There is no limitation in a value of L and M, and L and M consist of a natural number. If a ratio between the number of input pixels and the number of output pixels is 3:8, L is 3 and M is 8.

In other words, the adder 51 adds an input value L to a feedback value from the modulo operation unit 52 for the unit of clock, and outputs the resultant value m to the modulo operation unit 52 (step 61). It is determined whether the input resultant value m is smaller than the number of output pixels M (step 62). If the input resultant value m is smaller than the number of output pixels M, the modulo operation unit 52 outputs the resultant value m to the divider 53 and the adder 51 as a numerator value (n=m) (step 65). If the input resultant value m is greater than the number of output pixels M, the modulo operation unit 52 outputs a load signal to the buffer 42 and the delay unit 43 so that a new data is loaded (step 63). At the same time, the modulo operation unit 52 outputs the remainder divided the output value of the adder 51 by the number of output pixels M as a numerator value (step 64) to the divider 53 and the adder 51. The divider 53 performs division using an output value of the modulo operation unit 52 as a numerator value n and the number of output pixels M as a denominator value m and outputs the resultant value as a weighted value α. The weighted value α is multiplied by the resultant value of the subtracter 54 by means of the multiplier 55 to generate a final output value of the operation unit 44. At this time, B is a current pixel input through the buffer 42 and A is a pixel value delayed by the delay unit 43 for the unit of line or pixel.

For example, it is assumed that a ratio between the number of input pixels and the number of output pixels is 3:8, L is 3 and M is 8. In this case, an initial value is 0. Accordingly, in the operation unit 44, a numerator value of an initial α is 0. If the value 0 is multiplied by the resultant value (B−A) of the subtracter, 0 is generated. Finally, A input from the delay unit 23 to the adder 45, that is, Y1 becomes the initial pixel value. Thereafter, if one clock passes, a numerator value of α becomes 3 and a denominator value thereof becomes 8 so that 3/8 and (B−A) are multiplied together. Thus, the resultant value is added to the output value A of the delay unit 43 by the adder 45. Then, a new pixel value is obtained as the following equation 2, wherein A is Y1 and B is Y2.

$$\frac{3}{8}(B-A)+A = \frac{3B}{8} - \frac{3A}{8} + \frac{8A}{8}$$ [Equation 2]

$$= \frac{(8-3)A}{8} + \frac{3B}{8}$$

$$= \frac{5A}{8} + \frac{3B}{8}$$

Thereafter, if one clock passes again, a numerator value of α becomes 6 and a denominator value thereof becomes 8 so that 6/8 and (B−A) are multiplied together. Thus, the resultant value is added to the output value A of the delay unit 43 by the adder 45. Then, a new pixel value is obtained as the following equation 3.

$$\frac{6}{8}(B-A)+A = \frac{6B}{8} - \frac{6A}{8} + \frac{8A}{8}$$ [Equation 3]

$$= \frac{(8-6)A}{8} + \frac{6B}{8}$$

$$= \frac{2A}{8} + \frac{6B}{8}$$

That is, it is noted that the numerator value of α is increased by a multiple of L based on the initial value as a reference value.

Accordingly, if one clock passes over again, α becomes $$\frac{(8-9)A}{8} + \frac{9B}{8}.$$

In this case, the modulo operation unit 52 generates a load signal so that a new pixel value is loaded. Also, the modulo operation unit 52 outputs a value 1 as a numerator value, corresponding to the remainder divided the value, which is increased by a multiple L, by the number of output pixels M.

Therefore, a new pixel value is obtained by the following equation 4, wherein A is Y2 and B is Y3.

$$\frac{1}{8}(B-A)+A = \frac{1B}{8} - \frac{1A}{8} + \frac{8A}{8}$$ [Equation 4]

$$= \frac{(8-1)A}{8} + \frac{1B}{8}$$

$$= \frac{7A}{8} + \frac{1B}{8}$$

Meanwhile, in case of a general format conversion, there may be various input/output color coordinate formats, such as 4:2:2, 4:2:0 and the like. Likewise, there may be provided scan types such as a sequential scanning type or interlaced scanning type. In this case, the operation unit as shown in FIG. 7 allows a format converter to be applicable to all cases.

In other words, input/output formats to be processed by the format converter may have different color coordinate samplings such as 4:2:2, 4:2:0, 4:1:1, and different scanning types such as a sequential scanning type or interlaced scanning type. Therefore, a format converter should satisfy such various conditions. Such a format converter which satisfies various conditions is shown in FIG. 7.

Figure 7:
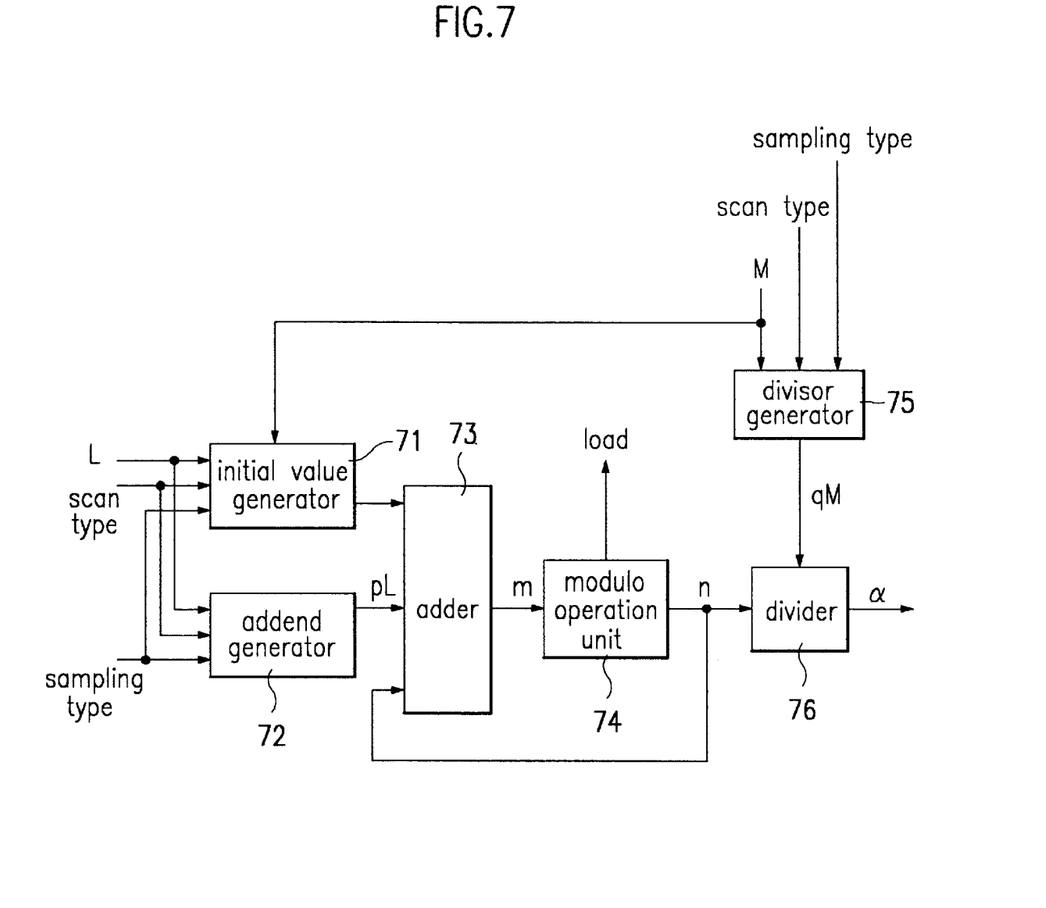
FIG. 7 is a block diagram of a video format converter according to other embodiment of the present invention.

Referring to FIG. 7, there are further provided an initial value generator 71, an addend generator 72, and a divisor generator 76 in the operation unit of FIG. 5. The initial value generator 71 generates an initial value required for format conversion using information on scanning types, information on color coordinate sampling, and information on the number of input pixels L and the number of output pixels M, and outputs the initial value to the adder 73. The addend generator 71 determines a number pL added by the adder 73 using information on scanning types, information on color coordinate sampling, and information on the number of input pixels L. The determined value has always a certain value if the input/output formats are determined. Accordingly, the adder 73 adds a value n generated by the modulo operation unit 74 per clock to the added number pL and outputs the resultant value to the modulo operation unit 74.

Meanwhile, the divisor generator 76 calculates a denominator value qM required for division using information scanning types, information on color coordinate sampling, and information on the number of output pixels M. The calculated value has always a certain value if input/output formats are determined. Accordingly, the divider 75 divides the output value n of the modulo operation unit 74 by a value qM input from the divisor generator 76 and outputs the resultant value as a weighted value α.

The operation of the modulo operation unit 74 is the same as that of FIG. 6.

As aforementioned, the video format converter according to the present invention has the following advantages.

Since the video format converter has a simple structure, a small amount of hardware can be realized. Also, since there are provided various input/output formats, it is not necessary to correct hardware due to a newly added format. Further, if the video format converter of the present invention is connected with a programmable synchronizing signal generator, it is possible to realized a video format converter which receives any format and outputs the same. Since differences in color coordinate sampling and scanning types as well as format size are considered, all kinds of format conversion can be realized without addition of a separate hardware.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video format converter for converting resolution of an input digital image to a different resolution, comprising:
   a delay unit for delaying the input image data for the unit of line or pixel depending on purpose of use; and
   an operation unit for calculating a weighted value a per clock and applying the weighted value a to a delay value of the delay unit to obtain a new pixel value for adjusting image width and height.

2. The video format converter as claimed in claim 1, wherein the operation unit calculates input time of new data and outputs a load signal to the delay unit at the input time so that a pixel value for format conversion is updated.

3. The video format converter as claimed in claim 1, wherein the operation unit includes:
   a calculating unit for calculating the weighted value α;
   a multiplier for multiplying a difference value (B−A) between a pixel value A delayed by the delay unit a n d a currently input pixel value B by the weighted value α; and
   an adder for adding a pixel value A from the delay unit to an output value of the multiplier.

4. The video format converter as claimed in claim 3, wherein the calculating unit includes:
   an adder for adding the number of input pixels L to a feedback value;
   a modulo operation unit for allowing an output value of the adder to be feedback to the adder and also outputting a load signal to the delay unit if the output value of the adder is greater than the number of output pixels M so that a new data is loaded, and at the same time for outputting the remainder divided the output value of the adder by the number of output pixels to the adder; and
   a divider for performing division using the output value of the modulo operation unit as a numerator value and the number of output pixels M as a denominator value and for outputting the resultant value as a weighted value α.

5. The video format converter as claimed in claim 4, wherein the calculating unit is not limited by variations in a value of L and M, and L and M consists of a natural number.

6. The video format converter as claimed in claim 1, further comprising a filter at the front of the delay unit, for eliminating aliasing when the size of an input image is reduced.

7. The video format converter as claimed in claim 3, wherein the calculating unit includes:
   an initial value generator for generating an initial value required for format conversion using information on scanning types, information on color coordinate sampling, and information on the number of input pixels and the number of output pixels;
   an addend generator for generating addend using information on scanning types, information on color coordinate sampling, and information on the number of input pixels;
   an adder for initially outputting a value generated by the initial value generator and then adding an added number generated by the addend generator to a feedback value;
   a modulo operation unit for allowing an output value of the adder to be feedback to the adder and also outputting a load signal to the delay unit if the output value of the adder is greater than the number of output pixels so that a new data is loaded, and at the same time for outputting the remainder divided the output value of the adder by the number of output pixels to the adder;
   a divisor calculator for calculating a denominator value required for division using information scanning types, information on color coordinate sampling, and information on the number of output pixels; and
   a divider for performing division using the output value of the modulo operation unit as a numerator value and the output value of the divisor calculator as a denominator value and for outputting the resultant value as a weighted value α.

8. The video format converter as claimed in claim 7, wherein the added number of the addend generator has always a certain value if input/output formats are determined.

9. The video format converter as claimed in claim 7, wherein the denominator value of the divisor generator has always a certain value if input/output formats are determined.

10. The video format converter as claimed in claim 1, further comprising a memory unit for temporarily storing input image data, outputting data stored at the rear as occasion demands, and updating the stored data in accordance with a load signal output from the operation unit.

11. A video format converter for converting resolution of an input digital image to a different resolution, comprising:
   a delay unit for delaying the input image data for the unit of line or pixel depending on purpose of use;

an adder for adding the number of input pixels L to a feedback value;

a modulo operation unit for allowing an output value of the adder to be feedback to the adder and also outputting a load signal to the delay unit if the output value of the adder is greater than the number of output pixels M so that a new data is loaded, and at the same time for outputting the remainder divided the output value of the adder by the number of output pixels to the adder;

a divider for performing division using the output value of the modulo operation unit as a numerator value and the number of output pixels as a denominator value and for outputting the resultant value as a weighted value α;

a multiplier for multiplying a difference value (B−A) between a pixel value A delayed by the delay unit and a currently input pixel value B input through the memory unit by the weighted value α; and an adder for adding a pixel value A from the delay unit to an output value of the multiplier.

12. The video format converter as claimed in claim 11, wherein the calculating unit is not limited by variations in a value of L and M, and L and M consists of a natural number.

13. The video format converter as claimed in claim 11, further comprising a filter at the front of the delay unit, for eliminating aliasing when the size of an input image is reduced.

14. A video format converter for converting resolution of an input digital image to a different resolution, comprising:

a delay unit for delaying the input image data for the unit of line or pixel depending on purpose of use;

an initial value generator for generating an initial value required for format conversion using information on scanning types, information on color coordinate sampling, and information on the number of input pixels and the number of output pixels;

an addend generator for generating an added number using information on scanning types, information on color coordinate sampling, and information on the number of input pixels;

an adder for initially outputting a value generated by the initial value generator and then adding the added number generated by the addend generator to a feedback value;

a modulo operation unit for allowing an output value of the adder to be feedback to the adder if the output value of the adder is smaller than the number of output pixels but outputting a load signal to the memory unit and the delay unit if the output value of the adder is greater than the number of output pixels so that a new data is loaded, and at the same time for outputting the remainder divided the output value of the adder by the number of output pixels to the adder;

a divisor calculator for calculating a denominator value required for division using information scanning types, information on color coordinate sampling, and information on the number of output pixels;

a divider for performing division using the output value of the modulo operation unit as a numerator value and the output value of the divisor calculator as a denominator value and for outputting the resultant value as a weighted value α;

a multiplier for multiplying a difference value (B−A) between a pixel value A delayed by the delay unit and a currently input pixel value B input through the memory unit by the weighted value α; and an adder for adding a pixel value A from the delay unit to an output value of the multiplier.

15. The video format converter as claimed in claim 14, wherein the added number of the addend generator has always a certain value if input/output formats are determined.

16. The video format converter as claimed in claim 14, wherein the denominator value of the divisor generator has always a certain value if input/output formats are determined.

17. The video format converter as claimed in claim 14, further comprising a memory for outputting data stored at the rear as occasion demands after temporarily storing input image data and updating the stored data in accordance with a load signal output from the operation unit.

* * * * *